Patented Aug. 3, 1926.

1,594,866

UNITED STATES PATENT OFFICE.

ARTHUR ZITSCHER, OF OFFENBACH-ON-THE-MAIN, GERMANY, ASSIGNOR TO I. G. FARBENINDUSTRIE AKTIENGESELLSCHAFT, OF FRANKFORT-ON-THE-MAIN, GERMANY.

HETEROCYCLIC MONOACYLACETYL BODIES AND PROCESS OF MAKING SAME.

No Drawing. Application filed June 7, 1923, Serial No. 644,064, and in Germany May 3, 1923.

My invention relates to new monoacylacetyl bodies of the general formula:

Y—CO—CH$_2$—CO—NH—R—X—R', wherein Y represents any radicle of the hydrocarbon series containing at least one and not more than six carbon atoms, R and R' the same or different aryl residues, X a residue, of a five membered heterocyclic nucleus, united with one of the aryl residues with one bond, while the other aryl residue has two carbon atoms in common with the heterocyclic nucleus, under this term being included atom complexes such as

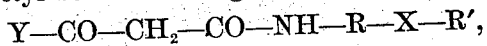

Under the definition given above for Y I include aliphatic as well aromatic radicles. The new compounds are obtained by heating acetoacetic acid ester or its homologes or analoges such as benzoylacetic acid ester with bases corresponding to the formula above mentioned, such as e. g. aminosubstituted phenylbenzothiazols, phenylbenzimidazols, phenyl-pseudo-aziminobenzenes and others, preferably in a solvent or diluent. The aminosubstituted phenylbenzothiazols have the formula:

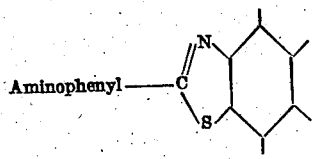

The aminosubstituted phenylbenzimidazols have the formula:

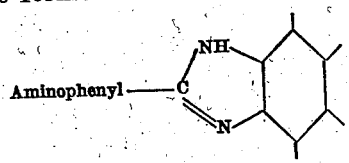

The aminosubstituted phenyl-pseudo-aziminobenzenes have the formula:

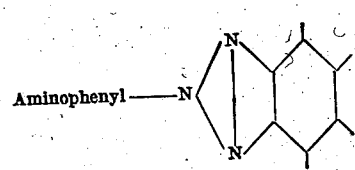

The new compounds may be used as primary products for the manufacture of dyestuffs, they possess in a surprising manner the character of a substantive body making possible their fixation on the cotton-fiber in alkaline solution and the development with diazo compounds to valuable shades, fast to washing.

The following example illustrates the invention, the parts being by weight, and all temperatures in centigrade degrees.

*Example.*

A solution of 80 parts of dehydrothiotoluidin in 100 parts of acetoacetic acid ester is poured while stirring into naphthalene, which is heated to 180°. The mixture is held at about 180°, until tl. reaction is finished. The pulp of crystals, formed after cooling down, is separated from naphthalene by washing with ether or carbon tetrachloride. The formed acetoacetyldehydrothiotoluidin, feebly colored, melts at 170°. Crystallized from alcohol it forms a colorless, crystalline powder, melting at 170–172° (not corrected) with feeble decomposition. It is soluble in alcohol and nitrobenzene, insoluble in ether and carbon tetrachloride. The said product, monoacetoacetyldehydrothiotoluidin, has the formula:

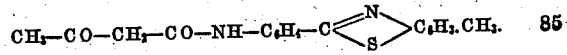

With other bases and other acylacetic acid esters, such as benzoylacetic acid ester the process may be conducted in a similar manner.

Now what I claim and desire to secure by Letters Patent is the following:

1. As new articles monoacylacetyl bodies of the general formula:

Y—CO—CH$_2$—CO—NH—R—X—R', wherein Y represents any radicle of the hydrocarbon series containing at least one and not more than six carbon atoms, R and R' aryl residues, X a residue of a five membered heterocyclic nucleus, united with one of the aryl residues with one bond, while the other aryl residue has two carbon atoms in common with the heterocyclic nucleus, which are when dry colorless to feebly colored crystalline powders, soluble in diluted caustic soda solution.

2. A process of making new monoacylacetyl bodies consisting in heating acylacetic acid esters with bases of the general formula:

$$NH_2-R-X-R',$$

wherein R and R' represent aryl residues, X a residue of a five membered heterocyclic nucleus, united with one of the aryl residues with one bond, while the other aryl residue has two carbon atoms in common with the heterocyclic nucleus.

3. As a new article monoacetoacetyldehydrothiotoluidin of the formula:

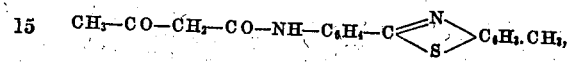

which is when dry a feebly colored crystalline powder, soluble in dilute caustic soda solution.

4. A process of making monoacetoacetyldehydrothiotoluidin consisting in heating acetoacetic acid ester with dehydrothiotoluidin.

5. A process of making monoacetoacetyldehydrothiotoluidin which consists in heating acetoacetic acid ester with dehydrothiotoluidin, in a diluent.

In testimony, that I claim the foregoing as my invention, I have signed my name, this 23d day of May, 1923.

ARTHUR ZITSCHER.